(12) United States Patent
Kondo et al.

(10) Patent No.: US 9,273,661 B2
(45) Date of Patent: Mar. 1, 2016

(54) COMBUSTION CONTROL DEVICE FOR INTERNAL COMBUSTION ENGINE AND COMBUSTION METHOD FOR HOMOGENEOUS LEAN AIR/FUEL MIXTURE

(71) Applicant: HONDA MOTOR CO., LTD., Tokyo (JP)

(72) Inventors: Takashi Kondo, Wako (JP); Hiroshi Sono, Wako (JP); Kohtaro Hashimoto, Wako (JP); Hiroshi Hanabusa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 325 days.

(21) Appl. No.: 14/027,418

(22) Filed: Sep. 16, 2013

(65) Prior Publication Data

US 2014/0076280 A1    Mar. 20, 2014

(30) Foreign Application Priority Data

Sep. 19, 2012   (JP) ................................ 2012-206209

(51) Int. Cl.
*F02P 5/14*       (2006.01)
*F02D 41/00*      (2006.01)
(Continued)

(52) U.S. Cl.
CPC .............. *F02P 5/14* (2013.01); *F02D 41/0057* (2013.01); *F02M 31/042* (2013.01);
(Continued)

(58) Field of Classification Search
CPC ........... F02P 5/14; F02P 5/1502; F02P 15/08; F02D 41/00; F02D 43/00; F02D 2250/36; F02D 41/0057; Y02T 10/126; Y02T 10/47
See application file for complete search history.

(56) References Cited

U.S. PATENT DOCUMENTS

| | | | | |
|---|---|---|---|---|
| 4,050,420 A | * | 9/1977 | Cataldo ................... | F02B 41/00 123/193.6 |
| 6,125,691 A | | 10/2000 | Hohner et al. | |

(Continued)

FOREIGN PATENT DOCUMENTS

| | | |
|---|---|---|
| CN | 1119239 A | 3/1996 |
| CN | 101324201 A | 12/2008 |

(Continued)

OTHER PUBLICATIONS

Japanese Office Action dated Aug. 5, 2014, for corresponding Japanese Patent Appln. No. 2012-206209.

(Continued)

*Primary Examiner* — Hieu T Vo
(74) *Attorney, Agent, or Firm* — Squire Patton Boggs (US) LLP

(57) ABSTRACT

A combustion control device for an engine capable of operation over a wide range and in which the NOx discharged amount is small is provided, as well as a combustion method for a homogeneous lean air/fuel mixture. The combustion method for a homogeneous lean air/fuel mixture of the present invention forms a homogeneous lean air/fuel mixture inside of the cylinder of the engine, and then causes this homogeneous lean air/fuel mixture to combust by way of spark ignition. A temperature at which a steep rise in a laminar burning velocity occurs when changing a cylinder temperature under a pressure condition corresponding to compression top dead center is defined as an inflection-point temperature. With the combustion method of the present invention, the cylinder temperature at compression top dead center inside of the cylinder is raised to higher than the inflection-point temperature upon combusting the homogeneous lean air/fuel mixture.

17 Claims, 9 Drawing Sheets

(51) Int. Cl.
  *F02P 5/15* (2006.01)
  *F02P 15/08* (2006.01)
  *F02M 31/04* (2006.01)
  *F02B 1/12* (2006.01)

(52) U.S. Cl.
  CPC .............. *F02P 5/1502* (2013.01); *F02P 15/08* (2013.01); *F02B 1/12* (2013.01); *F02D 2250/36* (2013.01); *Y02T 10/126* (2013.01); *Y02T 10/46* (2013.01); *Y02T 10/47* (2013.01)

(56) References Cited

U.S. PATENT DOCUMENTS

| | | | |
|---|---|---|---|
| 8,437,945 B2* | 5/2013 | Haskara | F02D 35/023 123/299 |
| 8,677,734 B2* | 3/2014 | Ramanathan | F01N 3/0814 60/274 |
| 2003/0066507 A1 | 4/2003 | Roberts, Jr. | |
| 2008/0196406 A1 | 8/2008 | Kuzuyama | |
| 2009/0095250 A1 | 4/2009 | Kuzuyama | |
| 2009/0099751 A1 | 4/2009 | Kuzuyama | |

FOREIGN PATENT DOCUMENTS

| | | |
|---|---|---|
| CN | 101338694 A | 1/2009 |
| DE | 24 43 413 C2 | 3/1976 |
| DE | 197 35 454 A1 | 2/1999 |
| DE | 197 06 126 C2 | 8/2002 |
| DE | 10 2006 021 192 A1 | 11/2007 |
| DE | 10 2008 053 620 A1 | 5/2010 |
| JP | H10-047113 A | 2/1998 |
| JP | 10-122015 A | 5/1998 |
| JP | 2002-227680 A | 8/2002 |
| JP | 2002-256927 A | 9/2002 |
| JP | 2004-301045 A | 10/2004 |
| JP | 2004-332647 A | 11/2004 |
| JP | 2007-162527 A | 6/2007 |
| JP | 2008-169714 A | 7/2008 |
| JP | 2008-202520 A | 9/2008 |
| JP | 2009-097365 A | 5/2009 |
| JP | 2009-097368 A | 5/2009 |
| JP | 2012-072743 A | 4/2012 |
| JP | 2012-127197 A | 7/2012 |
| WO | WO 96/13655 A1 | 5/1996 |

OTHER PUBLICATIONS

Wang Yu, "Experimental Research and Numerical Simulation on the Performance and Working of a SI HCNG Engine", 2009.

Chinese Office Action application No. 201310424541.2 mailed Aug. 6, 2015.

German Search Report application No. 10 2013 218 579.0 dated Apr. 3, 2014.

Office Action dated Dec. 14, 2015 corresponding to German Patent Application No. 102013218579.0 and English translation thereof.

* cited by examiner

COMBINED EXAMPLE 1

(a) IMEP_COV<6%

(b) IMEP_COV>6%

COMBINED EXAMPLE 2

(a) IMEP_COV<6%

(b) IMEP_COV>6%

COMBINED EXAMPLE 3

(a) IMEP_COV<6%   (b) IMEP_COV>6%

COMBINED EXAMPLE 4

(a) IMEP_COV<6%   (b) IMEP_COV>6%

SENSITIVITY CALCULATION RESULT AT INITIAL TEMPERATURE 900[K](< INFLECTION-POINT TEMPERATURE) CONDITION

LAMINAR BURNING VELOCITY INCREASE

SENSITIVITY CALCULATION RESULT AT INITIAL TEMPERATURE 1000[K](> INFLECTION-POINT TEMPERATURE) CONDITION

LAMINAR BURNING VELOCITY INCREASE

FIG. 11
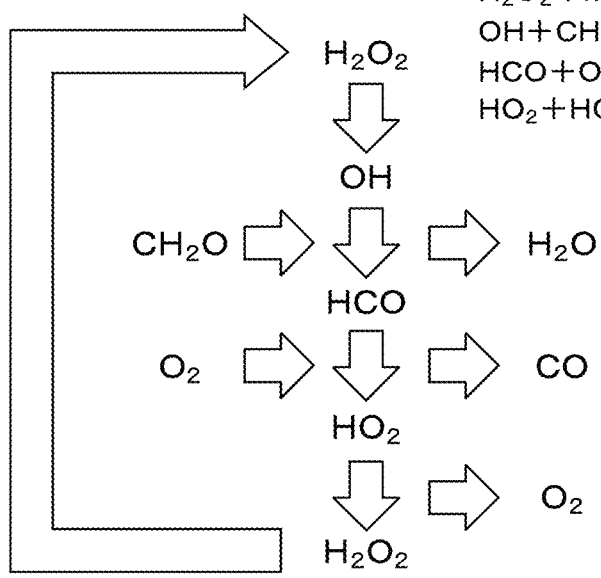
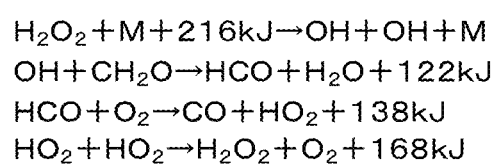

(a) A/F=30.0     (b) A/F=30.5

COMBUSTION CONTROL DEVICE FOR INTERNAL COMBUSTION ENGINE AND COMBUSTION METHOD FOR HOMOGENEOUS LEAN AIR/FUEL MIXTURE

This application is based on and claims the benefit of priority from Japanese Patent Application No. 2012-206209, filed on 19 Sep. 2012, the content of which is incorporated herein by reference.

BACKGROUND OF THE INVENTION

1. Field of the Invention

The present invention relates to a combustion control device for internal combustion engines and a combustion method for a homogeneous lean air/fuel mixture. In more detail, the present invention relates to a combustion control device for internal combustion engines that forms a homogeneous lean air/fuel mixture inside of the cylinder of an internal combustion engine, and causes this homogeneous lean air/fuel mixture to combust by spark ignition, and a combustion method for a homogeneous lean air/fuel mixture.

2. Related Art

As an effective means for optimization of gasoline engines, lean combustion establishing the air/fuel ratio of an air/fuel mixture to be leaner than a theoretical air/fuel ratio has been proposed. Since NOx in exhaust cannot be purified with a three-way catalyst by lean combustion, for a lean-burn engine, reducing the NOX amount itself discharged from the engine, i.e. improving the combustion limit air/fuel ratio (hereinafter referred to as "lean limit"), has been important.

As one of the techniques for improving the lean limit, a technique of causing a lean air/fuel mixture to combust stably as an entire cylinder by arranging in layers comparatively lean air/fuel mixtures in the vicinity of a spark plug provided in the cylinder has been proposed (for example, Patent Documents 1 and 2).

[Patent Document 1] Japanese Unexamined Patent Application, Publication No. H10-122015
[Patent Document 2] Japanese Unexamined Patent Application, Publication No. 2002-256927

SUMMARY OF THE INVENTION

However, with this technique, since the comparatively lean air/fuel mixtures combust in the first half of combustion, even if the lean limit could be raised, it would not be possible to decrease the NOx discharged amount by an amount in proportion thereto. On the other hand, a combustion method called HCCI combustion that forms a homogeneous lean premixture inside the cylinder and causes this to auto-ignite has been proposed; however, there have been problems such as the narrowness of the operating range in which stable combustion is possible and difficulty in the controllability relative to environmental fluctuations.

The present invention has been made taking the above such problems into account, and has an object of providing a combustion control device for an internal combustion engine that enables operation over a wide range and for which the NOx discharged amount is small, as well as a combustion method for a homogeneous lean air/fuel mixture.

A first aspect of the present invention is a combustion control device for an internal combustion engine, including: an air/fuel mixture formation means for forming a homogeneous lean air/fuel mixture inside of a cylinder of the internal combustion engine; and a spark ignition means provided inside of the cylinder, in which the internal combustion engine ignites to combust a homogeneous lean air/fuel mixture formed by the air/fuel mixture formation means by way of the spark ignition means, and in which a temperature at which a steep rise in a laminar burning velocity occurs when changing a cylinder temperature under a pressure condition corresponding to compression top dead center is defined as an inflection-point temperature, and the cylinder temperature at compression top dead center inside of the cylinder when combusting the homogeneous lean air/fuel mixture is higher than the inflection-point temperature.

According to a second aspect of the present invention, in this case, it is preferable for the steep rise in the laminar burning velocity at the inflection-point temperature to occur due to decomposition reaction of $H_2O_2$.

According to a third aspect of the present invention, in this case, it is preferable for the cylinder temperature at compression top dead center inside of the cylinder to be at least about 1000 K upon combusting the homogeneous lean air/fuel mixture.

According to a fourth aspect of the present invention, in this case, it is preferable for the compression ratio of the internal combustion engine to be set to within the range of 12 to 15, and the air/fuel mixture formation means to set the air/fuel ratio of the homogeneous lean air/fuel mixture to at least 25 A/F.

According to a fifth aspect of the present invention, in this case, it is preferable for recirculation of exhaust gas into the cylinder to be stopped during combustion of the homogeneous lean air/fuel mixture.

According to a sixth aspect of the present invention, in this case, it is preferable to further include an intake-air heating means for heating intake air prior to being introduced inside of the cylinder.

According to a seventh aspect of the present invention, in this case, it is preferable for the spark ignition means to perform ignition a plurality of times that is at least twice before reaching compression top dead center.

According to eighth aspect of the present invention, combustion method for a homogeneous lean air/fuel mixture includes forming a homogeneous lean air/fuel mixture inside of a cylinder of an internal combustion engine, and causing the homogeneous lean air/fuel mixture to combust by way of spark ignition, in which a temperature at which a steep rise in a laminar burning velocity occurs when changing a cylinder temperature under a pressure condition corresponding to compression top dead center is defined as an inflection-point temperature, and the cylinder temperature at compression top dead center inside of the cylinder when combusting the homogeneous lean air/fuel mixture is raised to higher than the inflection-point temperature.

With the first aspect of the present invention, the homogeneous lean air/fuel mixture formed inside of the cylinder by the air/fuel mixture formation means is ignited to combust by the spark ignition means. In this case, the present invention can increase the laminar burning velocity on the order of which stable combustion is possible, while setting the air/fuel ratio of the air/fuel mixture to sufficiently lean (e.g., at least 24 A/F), by raising the cylinder temperature at compression top dead center to higher than a predetermined inflection-point temperature. More specifically, although the lean limit of conventional homogeneous lean combustion is on the order of 18 A/F, this can be raised up to on the order of at least 30 A/F according to the present invention. In addition, by causing a homogeneous air/fuel mixture to combust, it is possible to decrease the NOx discharged amount by the amount by which the air/fuel mixture was leaned out. Furthermore, by employing a spark ignition means, contrary to HCCI combustion, it is possible to stably combust over a wide operating range.

According to the second aspect of the present invention, by raising the cylinder temperature at compression top dead center to higher than the inflection-point temperature, OH radicals generated by the decomposition reaction of $H_2O_2$ can be employed to increase the laminar burning velocity to an extent at which stable combustion becomes possible even with a homogeneous lean air/fuel mixture.

According to the third aspect of the present invention, by establishing the cylinder temperature at compression top dead center of at least 1000 K, it is possible to reliably raise the cylinder temperature to higher than the inflection-point temperature to allow the homogeneous lean air/fuel mixture to stably combust.

According to the fourth aspect of the present invention, by setting the compression ratio to within the range of 12 to 15, it is possible to raise the cylinder temperature at compression top dead center to an extent at which knocking does not occur. Therefore, raising the cylinder temperature at compression top dead center to higher than the inflection-point temperature can be facilitated.

According to the fifth aspect of the present invention, by stopping the recirculation of exhaust gas into the cylinder when combusting the homogeneous lean air/fuel mixture, it is possible to prevent the cylinder temperature from declining.

With the sixth aspect of the present invention, the cylinder temperature at compression top dead center can be stably raised to higher than the inflection-point temperature under various environments by heating the intake air prior to being introduced inside of the cylinder by the intake-air heating means, whereby the lean limit can be raised.

With the seventh aspect of the present invention, the cylinder temperature at compression top dead center can be raised to higher than the inflection-point temperature by performing ignition a plurality of time before reaching compression top dead center, whereby the lean limit can be raised.

The same effects as the first aspect are exerted by the eighth aspect of the present invention.

BRIEF DESCRIPTION OF THE DRAWINGS

FIG. 11 is a view schematically showing a $H_2O_2$ reaction loop considered to progress in a region higher than the inflection-point temperature;

DETAILED DESCRIPTION OF THE INVENTION

First Embodiment

Figure 1:
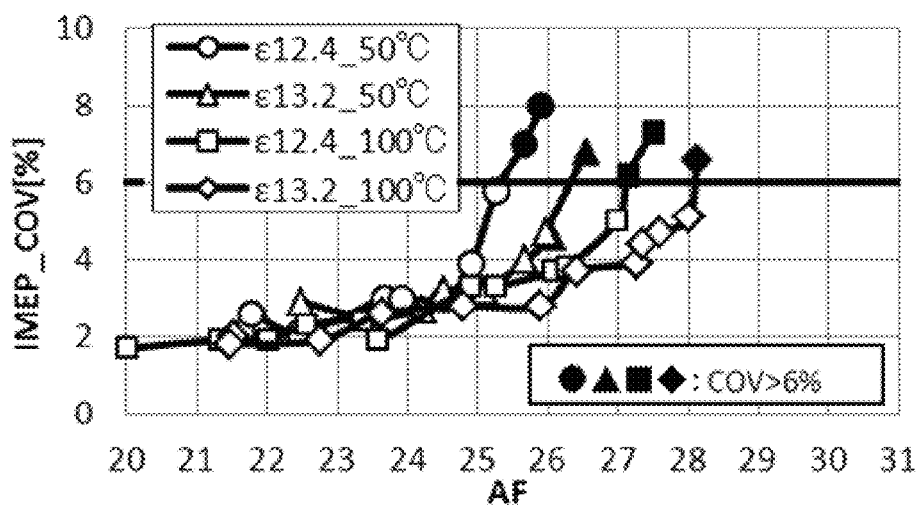
FIG. 1 is a graph showing a relationship between the air/fuel ratio of an air/fuel mixture and a rate of variability in an indicated mean effective pressure in a test machine (combined examples 1-4) according to a first embodiment of the present invention.

Hereinafter, a first embodiment of a combustion method for a homogeneous lean air/fuel mixture of the present invention, and a combustion control device for an internal combustion engine (hereinafter simply referred to as "engine") configured adopting this combustion method will be explained while referencing the drawings.

Various elements of a single cylinder engine and combustion control device thereof according to the present embodiment are as in the following Table 1. It should be noted that the engine and combustion control device thereof according to the present embodiment correspond to a test machine that has been configured in order to clarify the concept of the combustion method of a homogeneous lean air/fuel mixture of the present invention. Application of the combustion method of the present invention to a mass production machine clarified by this test machine will be explained in detail as a second embodiment later.

TABLE 1

| | |
|---|---|
| DISCHARGED AMOUNT | 402 [cm$^3$] |
| BORE × STROKE | 80 × 80 [mm] |
| COMPRESSION RATE | 12.4, 13.2 |
| VALCE TRAIN | DOHC 4-VALVE (Thereamong, one IN valve stopped) |
| INTAKE SYSTEM | INTAKE-AIR HEATER |
| IGNITION SYSTEM | MASS-PRODUCTION ARTICLE |

TABLE 1-continued

| FUEL INJECTION SYSTEM OPERATING RANGE | ARRANGED 1.5 [m] UPSTREAM FROM INTAKE VALVE ENGINE REVOLUTION SPEED 1500 [rpm] INDICATED MEAN EFFECTIVE PRESSURE 300 [kPa] |
|---|---|

As an air/fuel mixture formation means for forming a homogeneous lean air/fuel mixture inside the cylinder in the test machine of the present embodiment, a fuel injector of the mass-production machine is provided at a position about 1.5 m upstream from the intake valve of the engine. By injecting fuel from the fuel injector at a place sufficiently to the upstream side from the intake valve in this way, it is possible to mix fuel and air between the place injected by the fuel injector up to the intake valve; therefore, a sufficiently homogeneous lean air/fuel mixture can be formed inside the cylinder.

As an intake-air heating means for heating the intake air prior to being introduced inside of the cylinder in the test machine of the present embodiment, the intake-air heater that heats intake air is provided in the intake channel. By heating the intake air with the intake-air heater in this test machine, the intake-air temperature and the cylinder temperature at compression top dead center are raised to higher than the inflection-point temperature described later, whereby it is possible stably combust a homogeneous lean air/fuel mixture.

The compression ratio of the engine will be explained. The cylinder temperature at compression top dead center rises as the compression ratio becomes greater; however, knocking will tend to occur if the compression ratio is too high. Therefore, the cylinder temperature at compression top dead center can be made higher than the inflection-point temperature described later, thereby making so that knocking does not occur; therefore, the compression ratio of the engine is preferably set to within the range of 12.0 to 15.0. For the test machine of the first embodiment, an engine with a compression ratio of 12.4 and an engine with that of 13.2 were prepared as engines within this range.

Table 2 shows a combustion control device for the engines of combined examples 1 to 4.

In combined example 1, the intake-air temperature was heated to 50° C. by the intake-air heater in the test machine having the compression ratio of 12.4.

In the combined example 2, the intake-air temperature was heated to 100° C. by the intake-air heater in the test machine having the compression ratio of 12.4.

In the combined example 3, the intake-air temperature was heated to 50° C. by the intake-air heater in the test machine having the compression ratio of 13.2.

In the combined example 4, the intake-air temperature was heated to 100° C. by the intake-air heater in the test machine having the compression ratio of 13.2.

TABLE 2

| | COMPRESSION RATE | INTAKE AIR TEMPERATURE |
|---|---|---|
| COMBINED EXAMPLE 1 | 12.4 | 50° C. |
| COMBINED EXAMPLE 2 | 12.4 | 100° C. |
| COMBINED EXAMPLE 3 | 13.2 | 50° C. |
| COMBINED EXAMPLE 4 | 13.2 | 100° C. |

Next, by changing the air/fuel ratio of the air/fuel mixture in each of combined examples 1 to 4 to a region sufficiently leaner than the theoretical air/fuel ratio (about 15 (A/F)), the relationships between the air/fuel ratio and the lean limit as well as lower limit of the NOx discharged amount (NOx concentration of exhaust immediately after engine) are verified.

FIG. 1 is a graph showing a relationship between the air/fuel ratio of an air/fuel mixture and a rate of variability in an indicated mean effective pressure (IMEP) in combined examples 1-4. In the present invention, with the IMEP rate of variability as an index showing the combustion instability of the engine, the IMEP rate of variability being no more than 6% is defined as the criterion of combustion stability of the engine. It should be noted that FIG. 1 shows results satisfying the above-mentioned combustion stability criterion with outlined symbols, and shows results not satisfying the combustion stability criterion with blacked out symbols.

As shown in FIG. 1, for all of the combined examples, combustion becomes unstable as the air/fuel ratio is set to lean. In addition, the maximum value of the air/fuel ratio that can achieve an IMEP rate of variability of no more than 6%, i.e. lean limit, differs according to the respective combined examples 1 to 4. More specifically, the lean limit of combined example 1 was about 25.3 (A/F), the lean limit of combined example 3 was about 26.4 (A/F), the lean limit of combined example 2 was about 27.1 (A/F), and the lean limit of combined example 4 was about 28.1 (A/F). In addition, according to this result shown in FIG. 1, the lean limit of combined example 4 having both high compression ratio and intake-air temperature is the highest. Therefore, increasing the cylinder temperature is considered to contribute to improving the lean limit.

Figure 2:
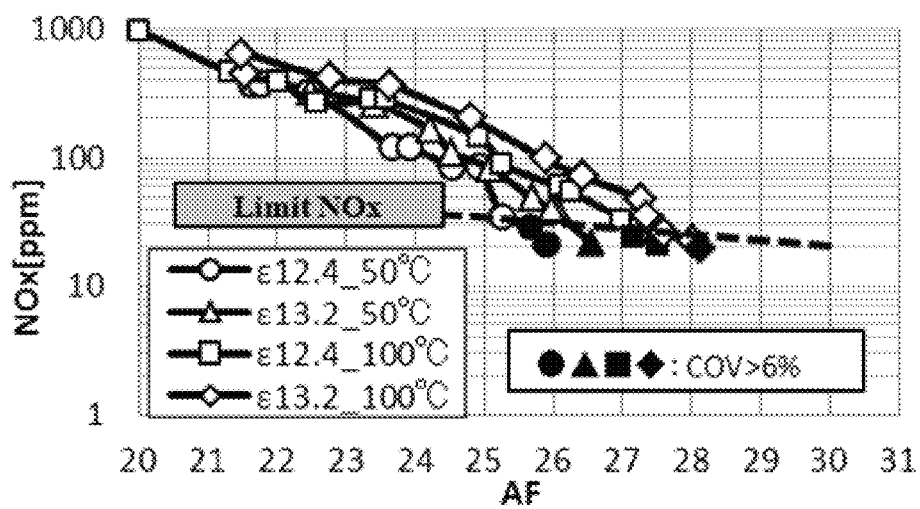
FIG. 2 is a graph showing a relationship between the air/fuel ratio of an air/fuel mixture and a NOx concentration of exhaust immediately after the engine in a test machine (combined examples 1-4) according to the embodiment.

FIG. 2 is a graph showing a relationship between the air/fuel ratio of the air/fuel mixture and the NOx concentration (ppm) of exhaust immediately after the engine for each of combined examples 1 to 4. It should be noted that FIG. 2 similarly shows results satisfying the above-mentioned combustion stability criterion with outlined symbols, and shows results not satisfying the combustion stability criterion with blacked out symbols for each of combined examples 1 to 4.

As shown in FIG. 2, the NOx discharged amount declines as the air/fuel mixture becomes lean, since a sufficiently leaned out air/fuel mixture is introduced into the cylinder in all of the combined examples. Therefore, as shown by the dotted line in FIG. 2, the NOx concentration of exhaust at this time declining as the lean limit becomes larger has been verified. In particular, in combined example 4 having the lean limit reaching about 28.1 A/F, the NOx concentration can be decreased down to no more than 20 ppm.

Figure 3:
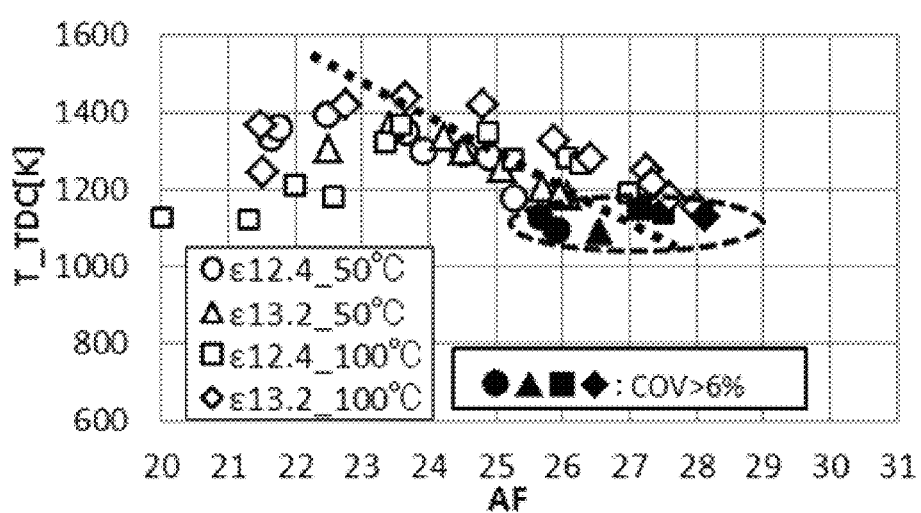
FIG. 3 is a graph showing a relationship between the air/fuel ratio of an air/fuel mixture and an average value of cylinder temperature at compression top dead center in a test machine (combined examples 1-4) according to the embodiment.
Figure 4:
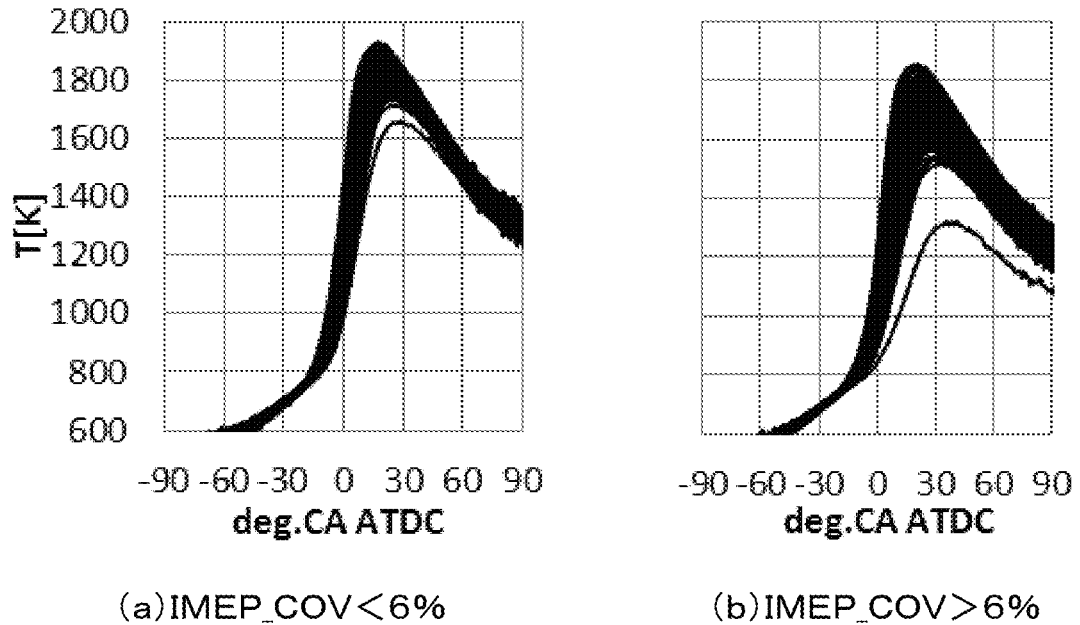
FIG. 4 provides graphs showing a relationship between crank angle and cylinder temperature in a test machine (combined example 1) according to the embodiment.
Figure 5:
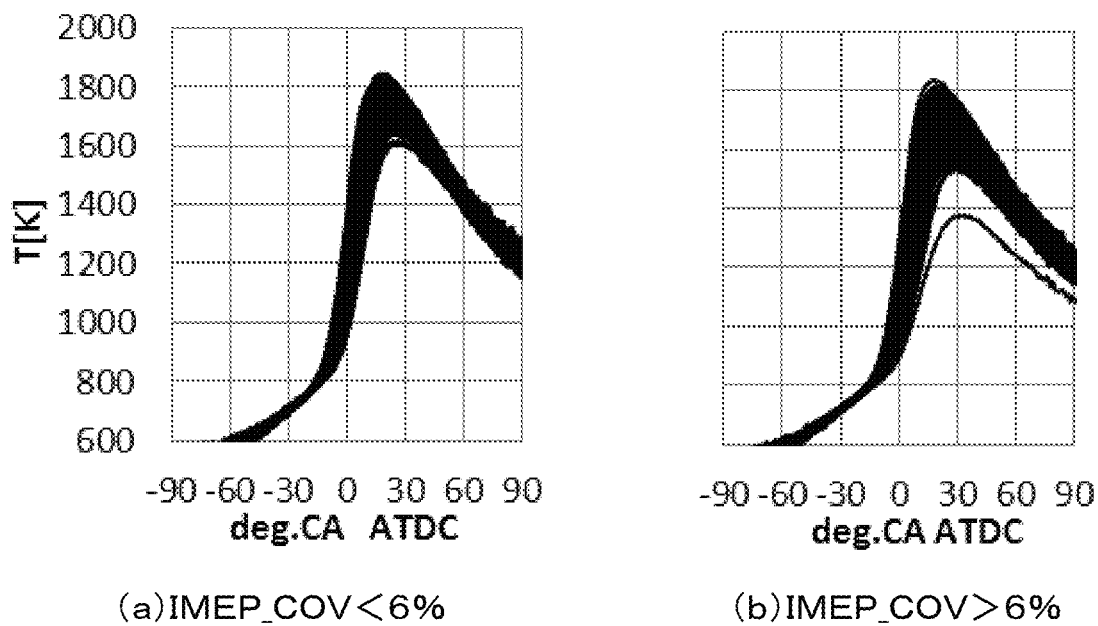
FIG. 5 provides graphs showing a relationship between crank angle and cylinder temperature in a test machine (combined example 2) according to the embodiment.
Figure 6:
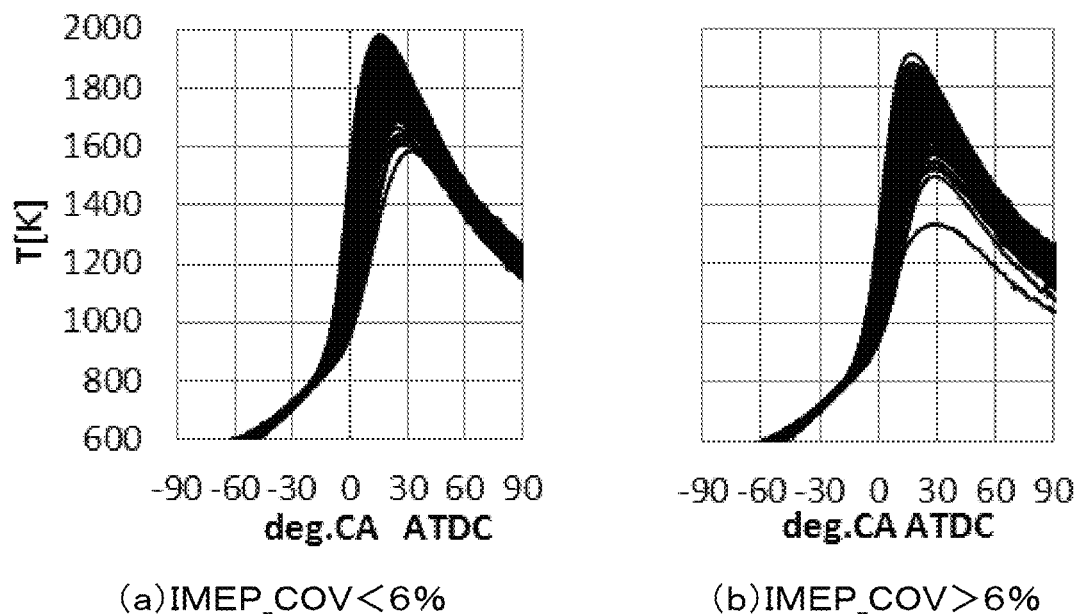
FIG. 6 provides graphs showing a relationship between crank angle and cylinder temperature in a test machine (combined example 3) according to the embodiment.
Figure 7:
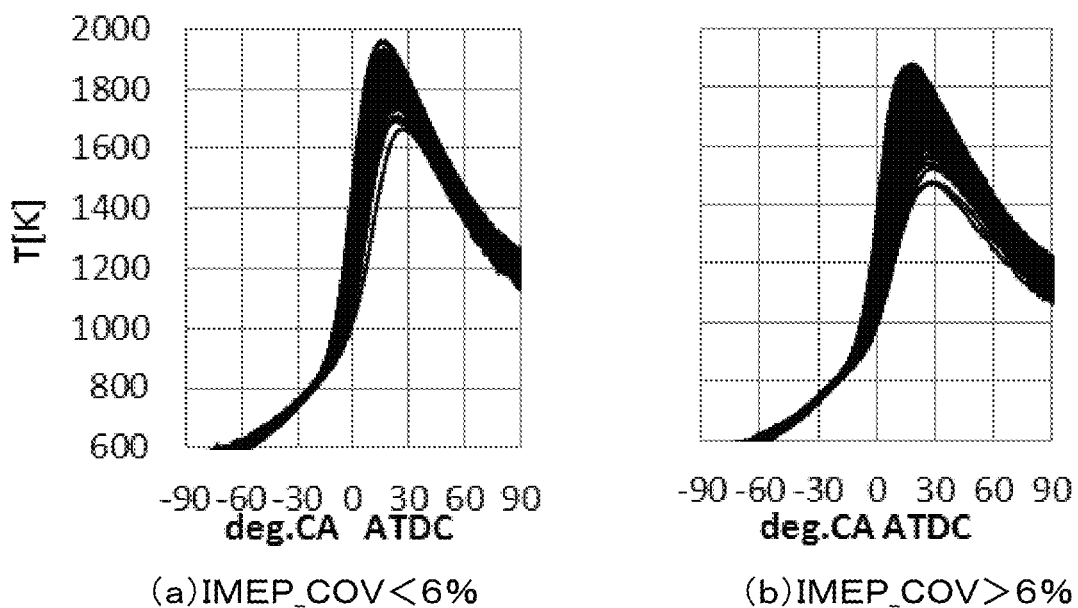
FIG. 7 provides graphs showing a relationship between crank angle and cylinder temperature in a test machine (combined example 4) according to the embodiment.

FIG. 3 is a graph showing a relationship between the air/fuel ratio of an air/fuel mixture and an average value of cylinder temperature at compression top dead center (hereinafter referred to as "average cylinder temperature") in combined examples 1-4, respectively. More specifically, cylinder temperature in the following explanation is a temperature calculated based on the cylinder pressure measured by a piezosensor provided in the cylinder. In addition, the average cylinder temperature T_TDC in FIG. 3 is defined as an average value of the cylinder temperature at compression top dead center over 200 cycles. It should be noted that, similarly to FIGS. 1 and 2, FIG. 3 shows results satisfying the above-mentioned combustion stability criterion with outlined symbols, and shows results not satisfying the combustion stability criterion with blacked out symbols for each of combined examples 1 to 4.

As shown by the dotted line in FIG. 3, there is a trend of the average cylinder temperature declining accompanying the air/fuel ratio of the air/fuel mixture being set to lean in the region of at least about 24.0 A/F in the respective combined examples 1 to 4. In addition, combustion becomes particularly unstable when the average cylinder temperature becomes no higher than about 1150 (K) in any of combined examples 1 to 4, irrespective of the magnitude of the lean limit. In other words, from this graph in FIG. 3, it is suggested that the cylinder temperature at compression top dead center is a parameter directly correlated to the stability of combustion, i.e. lean limit, in the case of combusting a homogeneous lean air/fuel mixture. Next, based on the history of cylinder temperature, the correlation between the cylinder temperature at compression top dead center and the lean limit will be reviewed in more detail.

FIGS. 4, 5, 6 and 7 provide graphs showing the relationship between crank angle CA (deg.) (defining compression top dead center as 0 deg.) and the cylinder temperature T (K) for combined example 1, combined example 2, combined example 3 and combined example 4, respectively. More specifically, FIGS. 4 to 7 show graphs obtained by plotting the cylinder temperature at each crank angle over 200 cycles, respectively. In addition, the graphs (a) on the left side in each of FIGS. 4 to 7 are during stable combustion in which the IMEP rate of variability is less than 6%, respectively, and the graphs (b) on the right side are during unstable combustion in which the IMEP rate of variability is greater than 6%, respectively.

As shown in graphs (a) on the left side of FIGS. 4 to 7, the cylinder temperature at compression top dead center always exceeds about 1000 K during stable combustion in any of combined examples 1 to 4.

In contrast, as shown in graphs (b) on the right side of FIGS. 4 to 7, cycles occur in which the cylinder temperature at compression top dead center falls below about 1000 K when combustion becomes unstable in any of combined examples 1 to 4. In more detail, it has been verified that, when a cycle occurs in which the cylinder temperature at compression top dead center has not reached about 1000 K, the subsequent heat production declines, and this becomes a cause of increasing the IMEP rate of variability. In other words, it has been verified that, by establishing the cylinder temperature at compression top dead center inside the cylinder of at least about 1000 K, which is higher than the inflection-point temperature described later, it is possible to stably combust a homogeneous lean air/fuel mixture.

Next, the results of simulation performed in order to clarify the reason for which a homogenous lean air/fuel mixture can be stably combusted when establishing a cylinder temperature at compression top dead center of at least about 1000 K will be explained. More specifically, under the cylinder pressure condition at compression top dead center of the above-mentioned test machine, the laminar burning velocity at every initial cylinder temperature was calculated by reaction calculation. The conditions of the simulation are as follows.

Analysis software used: Chemkin Pro
Reaction model used: gasoline surrogate reaction model (refer to Hashimoto, Koutarou, Mitsuo Koshi, Akira Miyoshi, Yoshiki Murakami, Tatsuo Oguchi, Yasuyuki Sakai, Hiromitsu Andou and Kentarou Tsuchiya; "Construction of Gasoline Combustion Reaction Model," Society of Automotive Engineers of Japan Pre-Congress Publication, No. 29-12, pp. 21-24 (2012))
Pressure condition: 3 MPa (corresponding to cylinder pressure at compression top dead center of test machine)
Equivalence ratio: 0.5 (about 30 A/F by conversion to air/fuel ratio)
Fuel used: PRF90

Figure 8:
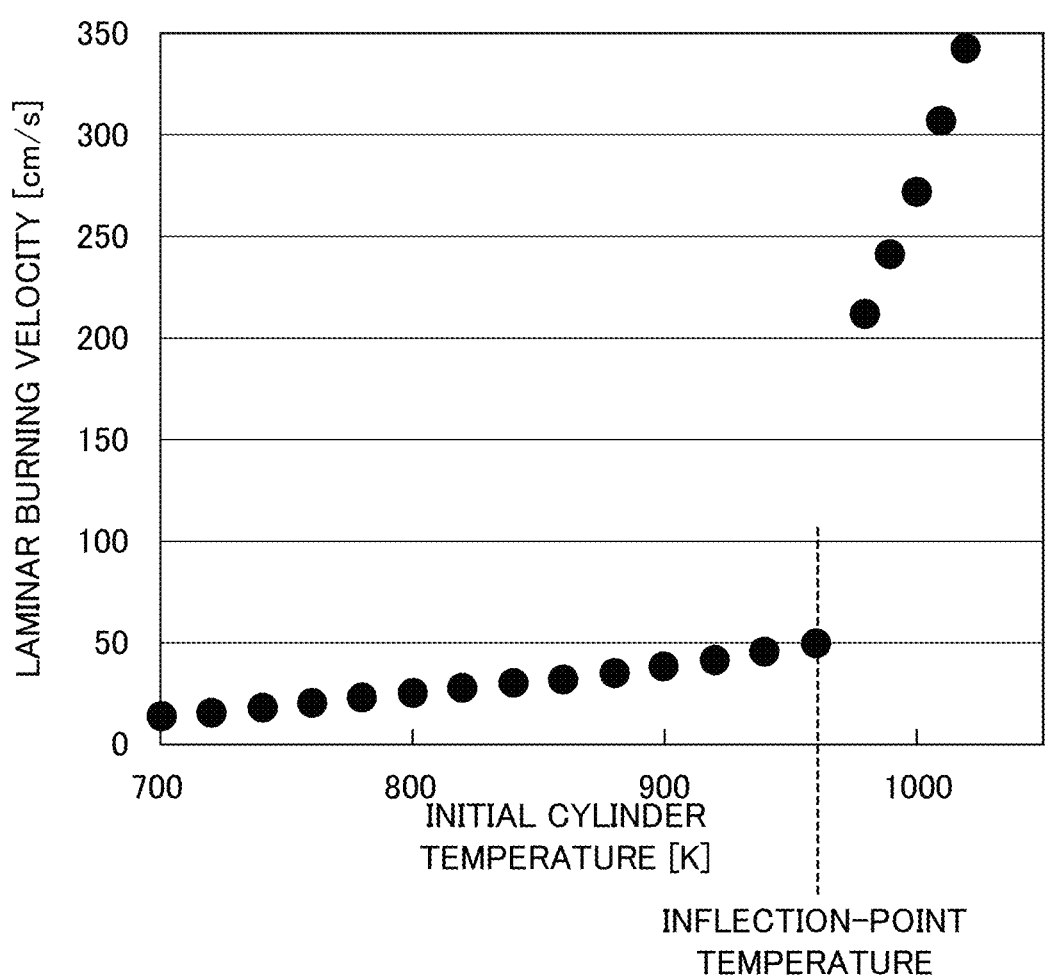
FIG. 8 is a graph showing a relationship between initial cylinder temperature and laminar burning velocity obtained by reaction calculation.

FIG. 8 is a graph showing the relationship between initial cylinder temperature (K) and laminar burning velocity (cm/s) obtained by the above reaction calculation.

As shown in FIG. 8, the laminar burning velocity increases as the initial cylinder temperature rises; however, it has become clear that a steep rise occurs at about 960 K. In the present invention, the temperature at which the steep rise in laminar burning velocity occurs when the cylinder temperature is made to change under a pressure condition corresponding to compression top dead center is defined as the inflection-point temperature.

Figure 9:
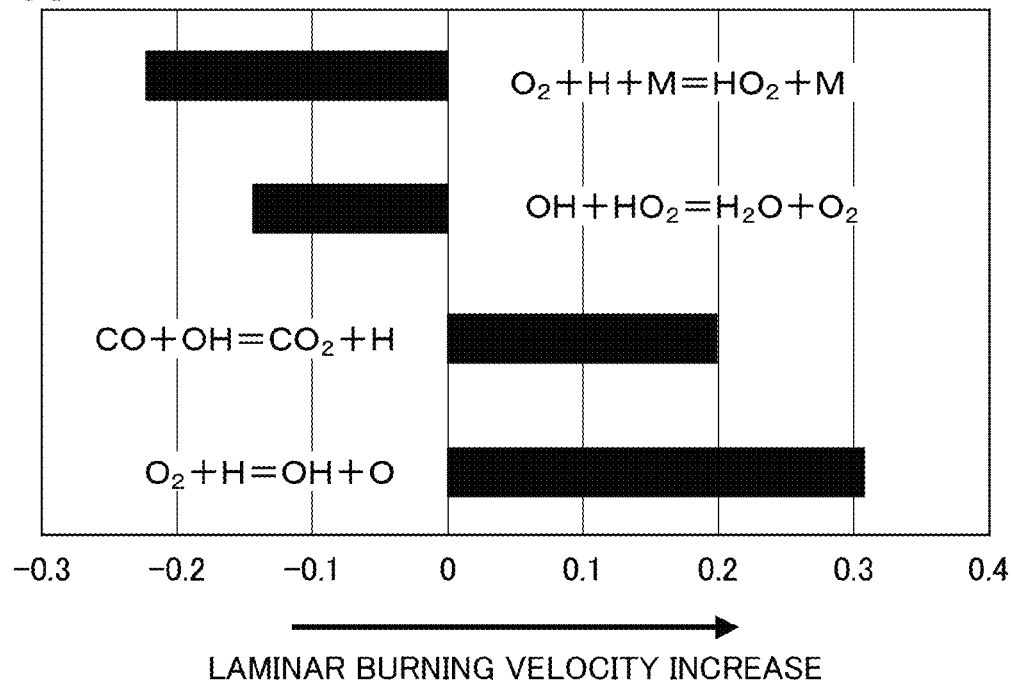
FIG. 9 is a graph showing, among elementary reactions contributing to the laminar burning velocity in the case of the initial cylinder temperature being lower than an inflection-point temperature (900 K), the top four in absolute value of sensitivity.
Figure 10:
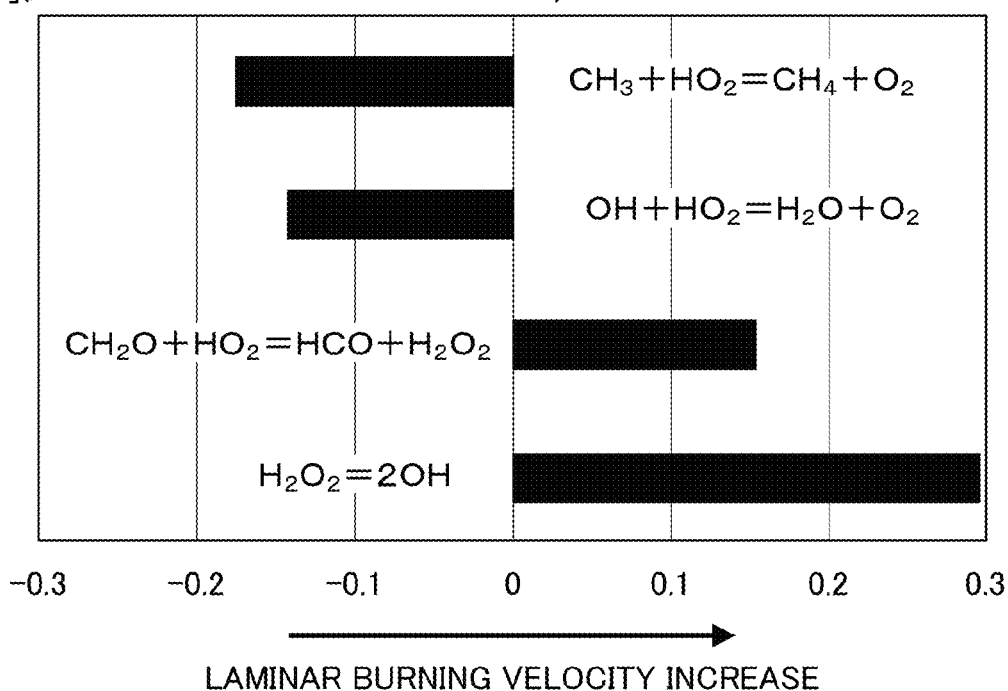
FIG. 10 is a graph showing, among elementary reactions contributing to the laminar burning velocity in the case of the initial cylinder temperature being higher than an inflection-point temperature (1000 K), the top four in absolute value of sensitivity.

FIGS. 9 and 10 are graphs respectively showing the top four in absolute value of sensitivity, among elementary reactions contributing to the laminar burning velocity in the case of the initial cylinder temperature being 900 K, which is lower than the above-mentioned inflection-point temperature and the case of the initial cylinder temperature being 1000 K, which is higher than the above-mentioned inflection-point temperature.

As shown in FIG. 9, in the case of the initial cylinder temperature being lower than the inflection-point temperature, mainly the oxygen and hydrogen reaction, and the carbon monoxide reaction contribute to the laminar burning velocity positively. This is the same as a normal fire reaction.

On the other hand, as shown in FIG. 10, when the initial cylinder temperature exceeds the inflection-point temperature, the $H_2O_2$ decomposition reaction occurs, and this contributes to laminar burning velocity positively. In other words, when the cylinder temperature is made to rise, the $H_2O_2$ decomposition reaction comes to occur from the vicinity of the inflection-point temperature, and it is considered that the OH radicals generated thereby contribute greatly to an increase in the laminar burning velocity. More specifically, when the cylinder temperature exceeds the inflection-point temperature, OH radicals are generated by $H_2O_2$ decomposing, after which the $H_2O_2$ reaction loop in which $H_2O_2$ is reproduced through an exothermal reaction progresses further (refer to FIG. 11), and the laminar burning velocity is considered to thereby increase. It should be noted that the $H_2O_2$ reaction loop of FIG. 11 in total is a reaction that generates heat by formaldehyde being oxidized as in the following equation.

$$2CH_2O + O_2 \rightarrow 2H_2O + 2CO + 473 \quad (kJ)$$

To summarize the above, in the present invention, by establishing the cylinder temperature at compression top dead center of a temperature higher than the inflection-point temperature to induce the $H_2O_2$ decomposition reaction, the laminar burning velocity can be sufficiently increased to allow for stable combustion even of a homogeneous lean air/fuel mixture.

It should be noted that the results shown in FIGS. 8 to 10 are based on reaction calculation with an equivalence ratio of 0.5; however, the above-mentioned inflection-point temperature is not considered to change greatly, even if changing the equivalence ratio. Therefore, the lean limit of combined example 4 of the test machine according to the present embodiment was about 28.1 A/F (refer to FIG. 1); however, the lean limit is considered to be able to be further improved by heating the intake air to an even higher temperature by an intake-air heater, for example, raising the engine compression ratio, or the like.

Second Embodiment

Next, a second embodiment of the present invention will be explained while referencing the drawings. With the above-mentioned test machine of the first embodiment, the intake-air heater that heats intake air prior to being introduced into the cylinder was used as a means for raising the cylinder temperature. However, it is technically difficult to accurately control the temperature of intake air in a vehicle while traveling, and not suited to the mass-production machine. Therefore, in the second embodiment, a device more suited to mass-production machines using a means other than an intake-air heater as the means for heating the cylinder temperature will be explained.

Various elements of a single cylinder engine and combustion control device thereof according to the present embodiment are as in the following Table 3.

TABLE 3

| | |
|---|---|
| DISCHARGED AMOUNT | 374 [cc] |
| BORE × STROKE | 73 × 89.5 [mm] |
| COMPRESSION RATE | 13.2 |
| VALCE TRAIN | DOHC 4-VALVE (Thereamong, one IN valve stopped) |
| INTAKE SYSTEM | W/VARIABLE VANE |
| IGNITION SYSTEM | MULTIPLE IGNITION-TYPE |
| FUEL INJECTION SYSTEM | PORT INJECTION, ATOMIZING NOZZLE |
| OPERATING RANGE | ENGINE REVOLUTION SPEED 1500 [rpm] INDICATED MEAN EFFECTIVE PRESSURE 300 [kPa] |

In the mass-production machine of the present embodiment, a fuel injector equipped with an atomizing nozzle is provided to the intake port outside of the cylinder as an air/fuel mixture formation means for forming a homogeneous lean air/fuel mixture inside of the cylinder. When comparing with the test machine of the first embodiment, the distance from the place at which fuel is injected until the cylinder is shorter; however, by using a fuel injector equipped with an atomizing nozzle, it is possible to form a sufficiently homogeneous air/fuel mixture inside the cylinder.

With the mass-production machine of the present embodiment, a multiple ignition-type ignition system was used in place of the intake-air heater explained in the first embodiment, as the means for raising the cylinder temperature. In other words, by performing ignition over a plurality of times which is at least twice until reaching compression top dead center, it is possible to cause the cylinder temperature at compression top dead center to rise up to about 1000 K even without using an intake-air heater.

Next, relationships between the air/fuel ratio and the lean limit as well as the lower limit of the NOx discharged amount are verified by changing the air/fuel ratio of the air/fuel mixture in the above such mass-production machine to a sufficiently leaner region than the theoretical air/fuel ratio.

Figure 12:
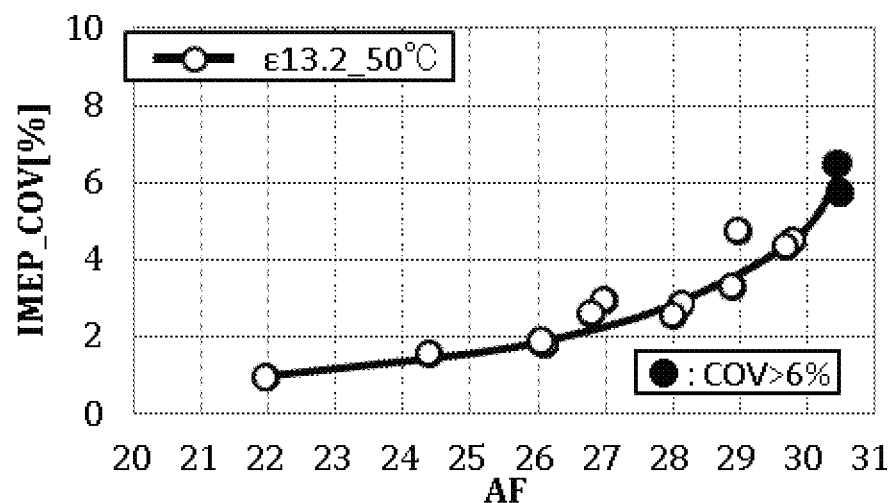
FIG. 12 is a graph showing a relationship between the air/fuel ratio of an air/fuel mixture and a rate of variability in an indicated mean effective pressure in a mass-production machine according to a second embodiment of the present invention.

FIG. 12 is a graph showing a relationship between the air/fuel ratio of the air/fuel mixture and the IMEP rate of variability in the mass-production machine of the present embodiment.

Figure 13:
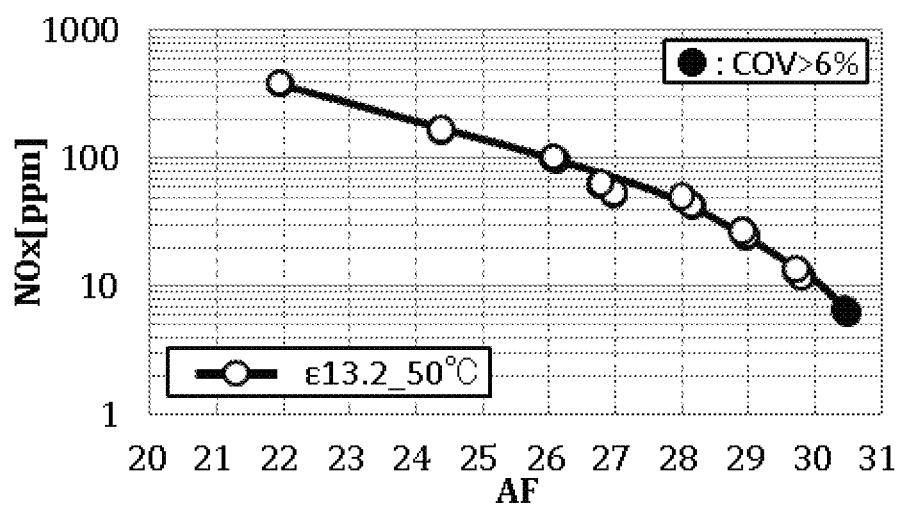
FIG. 13 is a graph showing a relationship between the air/fuel ratio of an air/fuel mixture and the NOx concentration of exhaust immediately after the engine in the mass-production machine according to the embodiment.

FIG. 13 is a graph showing a relationship between the air/fuel ratio of the air/fuel mixture and the NOx concentration of exhaust immediately after the engine in the mass-production machine of the present embodiment.

Figure 14:
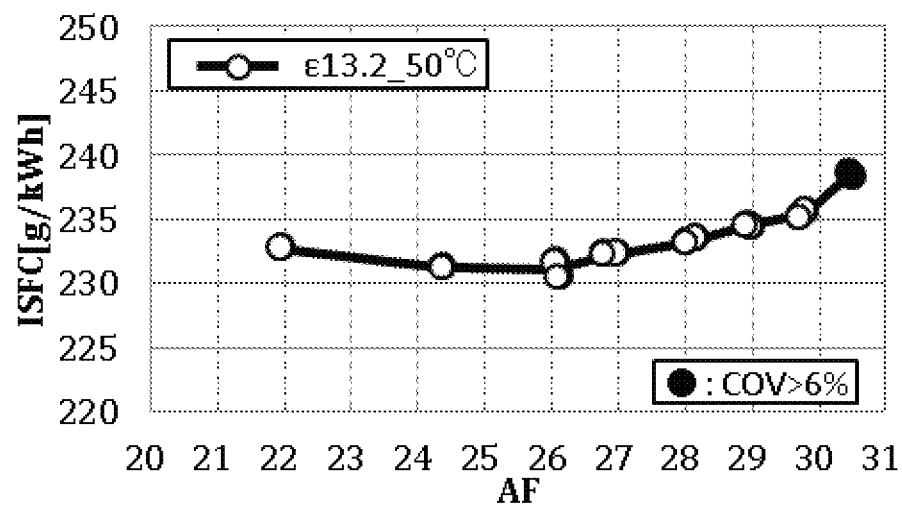
FIG. 14 is a graph showing a relationship between the air/fuel ratio of an air/fuel mixture and an indicated fuel consumption rate in the mass-production machine according to the embodiment.

FIG. 14 is a graph showing a relationship between the air/fuel ratio of the air/fuel mixture and an indicated fuel consumption rate (ISFC) in the mass-production machine of the present embodiment.

It should be noted that the temperature of the intake air prior to being introduced into the cylinder was 50° C. In addition, these FIGS. 12 to 14 show results satisfying the above-mentioned combustion stability criterion with outlined symbols, and show results not satisfying the combustion stability criterion with blacked out symbols for the above-mentioned mass-production machine.

As shown in FIG. 12, the lean limit was about 30.0 A/F according to the mass-production machine of the present embodiment. In addition, as shown in FIG. 13, the NOx discharged amount declined as the air/fuel ratio becomes leaner similarly to the first embodiment, due to a sufficiently leaned out air/fuel mixture being introduced into the cylinder. Furthermore, according to the mass-production machine of the present embodiment as shown in FIG. 14, the air/fuel ratio can be made lean without causing the indicated fuel consumption rate to deteriorate.

Figure 15:
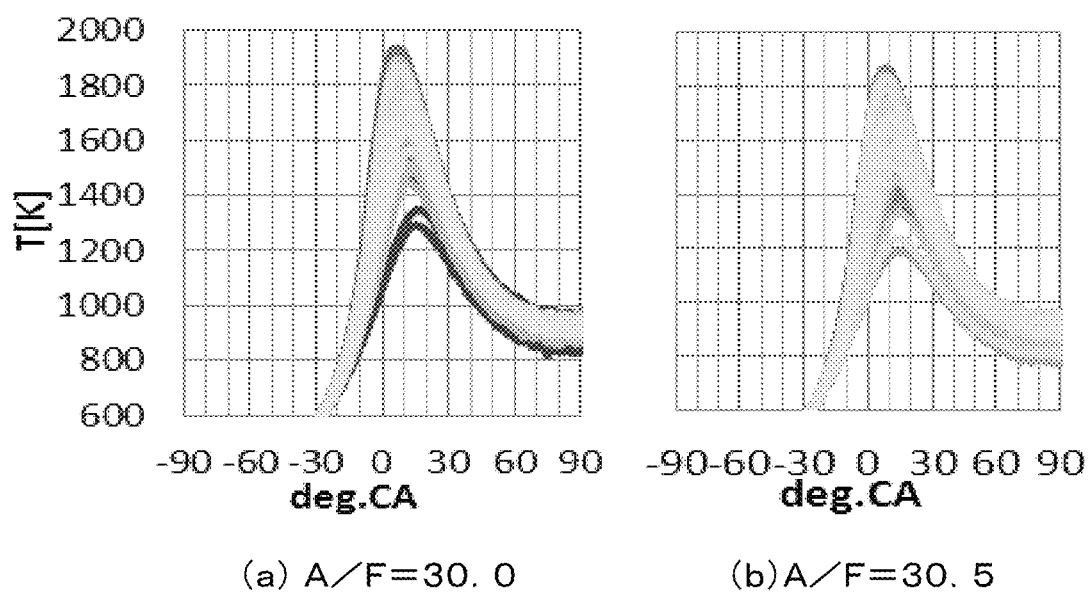
FIG. 15 provides graphs showing a relationship between the crank angle and cylinder temperature in the mass-production machine according to the embodiment.

FIG. 15 is a graph showing the crank angle CA (deg.) of the mass-production machine of the present embodiment and the cylinder temperature T (K). More specifically, FIG. 15 shows a graph obtained by plotting the cylinder temperature at each crank angle over 200 cycles. In addition, graph (a) on the left side of FIG. 15 is a graph when the air/fuel ratio at which the IMEP rate of variability became lower than 6% was 30.0 A/F, and graph (b) on the right side is a graph when the air/fuel ratio at which the IMEP rate of variability became greater than 6% was 30.5 A/F.

As shown in FIG. 15($a$), the cylinder temperature at compression top dead center during stable combustion always exceeded about 1000 K, similarly to the first embodiment.

In contrast, as shown in FIG. 15($b$), when combustion becomes unstable, a cycle occurs in which the cylinder temperature at compression top dead center falls below about 1000 K. Therefore, it was verified that a homogeneous lean air/fuel mixture can be stably combusted also in the mass-production machine as indicated in Table 3, by establishing the cylinder temperature at compression top dead center inside the cylinder of at least about 1000 K, which is higher than the inflection-point temperature.

Although two embodiments of the present invention have been explained above, the present invention is not to be limited thereto.

For example, although a case of using a single cylinder engine has been explained in the above embodiments, the combustion method of the present invention can also be applied to an engine of any number of cylinders. In addition, although a case in which the engine revolution speed was set as 1500 rpm and the indicated mean effective pressure was set as 300 kPa for the engine operating conditions has been explained in the above embodiments, the present invention can also be applied to any operating range without being limited to this.

It should be noted that the simulation results shown in FIGS. 8 to 10 are based on the reaction calculations with an equivalence ratio of 0.5; however, the magnitude of the above-mentioned inflection-point temperature is not considered to greatly change even if changing the equivalence ratio, for example. Therefore, although the lean limit of the test machine of the first embodiment was about 28.1 A/F and the lean limit of the mass-production machine of the second embodiment was about 30.0 A/F, these lean limits can further increase by raising the cylinder temperature at compression top dead center, for example.

In addition, in order to form a homogeneous air/fuel mixture inside the cylinder, fuel is injected from a position sufficiently separated from the intake port in the first embodiment, and fuel is injected by a fuel injector equipped with an atomizing nozzle in the second embodiment; however, the means for forming a homogeneous air/fuel mixture inside the cylinder of the present invention is not limited thereto. For example, it is possible to form a sufficiently homogeneous air/fuel mixture inside the cylinder also in a case of providing a fuel injector inside the cylinder by injecting fuel at an early stage such as during an intake stroke, and then providing a time period to allow premixing.

In addition, in order to establish a cylinder temperature at compression top dead center that is higher than the inflection-point temperature, the intake-air heater was used along with raising the compression ratio in the first embodiment, and a multiple ignition-type ignition system was used along with raising the compression ratio in the second embodiment; however, the means for raising the cylinder temperature in the present invention is not limited thereto. For example, since the flame front area increases when the cylinder flow becomes stronger, it is also possible to raise the cylinder temperature thereby.

In addition, when combusting a homogeneous lean air/fuel mixture by the combustion method of the present invention, it is preferable for the recirculation of exhaust into the cylinder to be prevented so that the cylinder temperature does not decline.

What is claimed is:

1. A combustion control device for an internal combustion engine, comprising: an air/fuel mixture formation means for forming a homogeneous lean air/fuel mixture inside of a cylinder of the internal combustion engine; and
a spark ignition means provided inside of the cylinder,
wherein the internal combustion engine ignites to combust a homogeneous lean air/fuel mixture formed by the air/fuel mixture formation means by way of the spark ignition means, and
wherein a temperature at which a steep rise in a laminar burning velocity occurs when changing a cylinder temperature under a pressure condition corresponding to compression top dead center is defined as an inflection-point temperature, and the cylinder temperature at compression top dead center inside of the cylinder when combusting the homogeneous lean air/fuel mixture is higher than the inflection-point temperature.

2. The combustion control device for an internal combustion engine according to claim 1, wherein the steep rise in the laminar burning velocity at the inflection-point temperature occurs due to decomposition reaction of $H_2O_2$.

3. The combustion control device for an internal combustion engine according to claim 2, wherein the cylinder temperature at compression top dead center inside of the cylinder is at least about 1000 K upon combusting the homogeneous lean air/fuel mixture.

4. The combustion control device for an internal combustion engine according to claim 2, wherein the compression ratio of the internal combustion engine is set to within the range of 12 to 15, and
wherein the air/fuel mixture formation means sets the air/fuel ratio of the homogeneous lean air/fuel mixture to at least 25 A/F.

5. The combustion control device for an internal combustion engine according to claim 2, wherein recirculation of exhaust gas into the cylinder is stopped during combustion of the homogeneous lean air/fuel mixture.

6. The combustion control device for an internal combustion engine according to claim 2, further comprising an intake-air heating means for heating intake air prior to being introduced inside of the cylinder.

7. The combustion control device for an internal combustion engine according to claim 2, wherein the spark ignition means performs ignition a plurality of times that is at least twice before reaching compression top dead center.

8. The combustion control device for an internal combustion engine according to claim 1, wherein the cylinder temperature at compression top dead center inside of the cylinder is at least about 1000 K upon combusting the homogeneous lean air/fuel mixture.

9. The combustion control device for an internal combustion engine according to claim 8, wherein the compression ratio of the internal combustion engine is set to within the range of 12 to 15, and
wherein the air/fuel mixture formation means sets the air/fuel ratio of the homogeneous lean air/fuel mixture to at least 25 A/F.

10. The combustion control device for an internal combustion engine according to claim 8, wherein recirculation of exhaust gas into the cylinder is stopped during combustion of the homogeneous lean air/fuel mixture.

11. The combustion control device for an internal combustion engine according to claim 8, further comprising an intake-air heating means for heating intake air prior to being introduced inside of the cylinder.

12. The combustion control device for an internal combustion engine according to claim 8, wherein the spark ignition means performs ignition a plurality of times that is at least twice before reaching compression top dead center.

13. The combustion control device for an internal combustion engine according to claim 1, wherein the compression ratio of the internal combustion engine is set to within the range of 12 to 15, and
wherein the air/fuel mixture formation means sets the air/fuel ratio of the homogeneous lean air/fuel mixture to at least 25 A/F.

14. The combustion control device for an internal combustion engine according to claim 1, wherein recirculation of exhaust gas into the cylinder is stopped during combustion of the homogeneous lean air/fuel mixture.

15. The combustion control device for an internal combustion engine according to claim 1, further comprising an intake-air heating means for heating intake air prior to being introduced inside of the cylinder.

16. The combustion control device for an internal combustion engine according to claim 1, wherein the spark ignition means performs ignition a plurality of times that is at least twice before reaching compression top dead center.

17. A combustion method for a homogeneous lean air/fuel mixture comprising forming a homogeneous lean air/fuel mixture inside of a cylinder of an internal combustion engine, and causing the homogeneous lean air/fuel mixture to combust by way of spark ignition,
wherein a temperature at which a steep rise in a laminar burning velocity occurs when changing a cylinder temperature under a pressure condition corresponding to compression top dead center is defined as an inflection-point temperature, and the cylinder temperature at compression top dead center inside of the cylinder when combusting the homogeneous lean air/fuel mixture is raised to higher than the inflection-point temperature.

* * * * *